Nov. 15, 1955
E. FURHOLMEN
2,723,417
HANDLE ASSEMBLY
Filed June 22, 1953
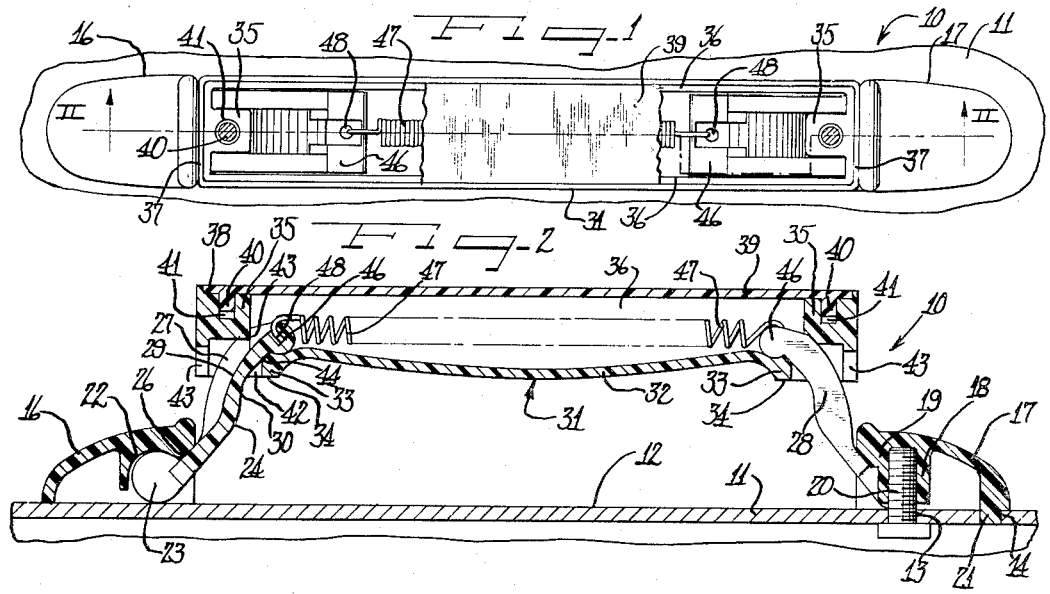
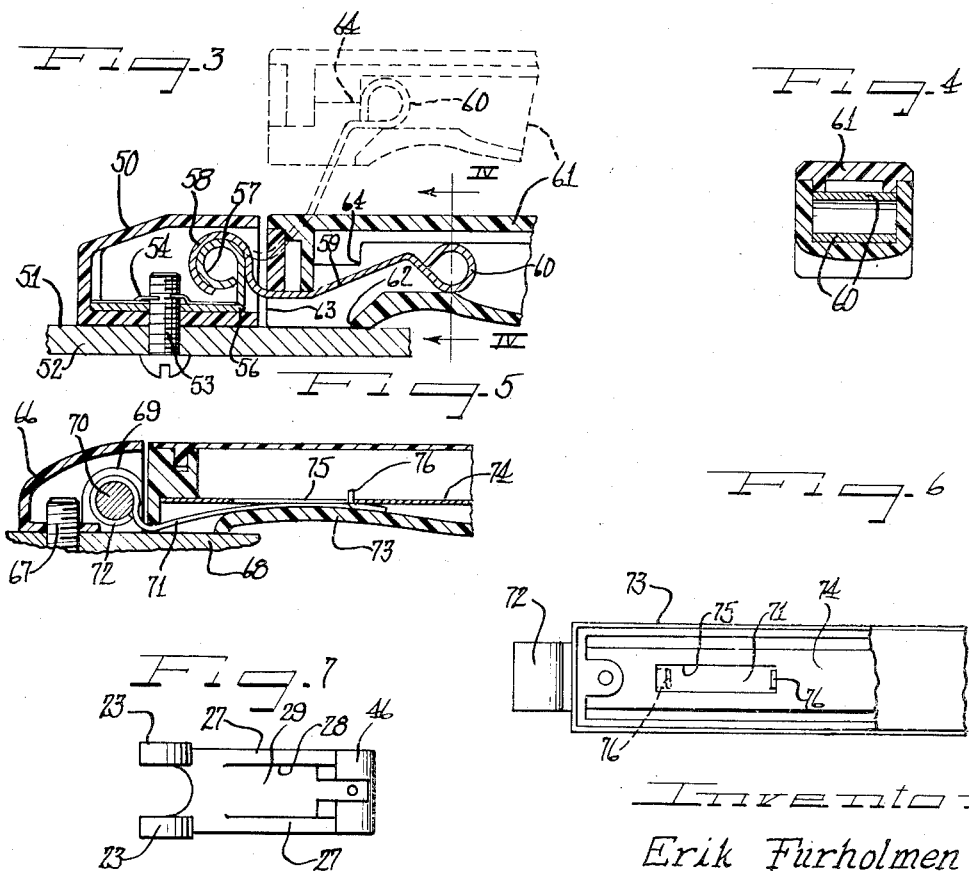
Inventor
Erik Furholmen

# United States Patent Office 2,723,417
Patented Nov. 15, 1955

2,723,417

HANDLE ASSEMBLY

Erik Furholmen, Lombard, Ill.

Application June 22, 1953, Serial No. 363,166

4 Claims. (Cl. 16—115)

This invention relates generally to handle assemblies and more particularly relates to a handle assembly comprising a pair of lever arms each having one end confined for pivotal movement only at spaced apart points with a hollow conformably shaped handle member adapted to be gripped by the hand of an operator extending between the spaced apart points and having spaced apart openings through which the other end of each lever arm may be slidably extended so as to be wholly received within the handle means being further provided to confine the other end of each lever arm in the handle to prescribe the outer limits of displacement of the handle away from a position between the pivotally confined ends of the lever arms.

It is an object of the present invention to provide an improved handle assembly which comprises a reduced number of simplified parts and which may be conveniently and economically fabricated and assembled.

Another object of the present invention is to provide an improved retracto-type handle assembly.

Yet another object of the present invention is to provide a handle assembly which will enhance the decorative appearance of a portable article without sacrificing the carrying utility of the handle assembly.

A further object of the present invention is to provide a handle assembly wherein all of the principal components may be fabricated as molded plastic articles.

Many other features, advantages and additional objects of the present invention will become manifest to those versed in the art upon making reference to the detailed description which follows and the accompanying sheet of drawings in which a preferred structural embodiment incorporating the principles of the present invention as shown by way of illustrative example.

On the drawings:

Figure 1 is a fragmentary plan view of a portable article utilizing the handle assembly provided in accordance with the principles of the present invention and with parts broken away and with parts shown in cross-section;

Figure 2 is a staggered cross-sectional view taken substantially on line II—II of Figure 1 but with the handle member of the assembly moved outwardly into a carrying position;

Figure 3 is a fragmentary cross-sectional view showing an alternative embodiment in accordance with the principles of the present invention;

Figure 4 is a fragmentary cross-sectional view taken substantially on line IV—IV of Figure 3;

Figure 5 is a fragmentary cross-sectional view illustrating another embodiment incorporating the principles of the present invention;

Figure 6 is a fragmentary broken plan view of the structure shown in Figure 5 with parts removed for the sake of clarity; and Figure 7 is a elevational view of one of the lever arms utilized in the embodiment of Figures 1 and 2 illustrating additional details of construction thereof.

As shown on the drawings:

The handle assembly of the present invention is indicated generally by the reference numeral 10 and finds a particularly useful application as a means of transporting a portable article indicated at 11.

The portable article 11 preferably includes a substantially flat surface 12 which is particularly characterized by spaced apart pairs of openings 13 and 14 adapted to underlie spaced apart end cap members indicated at 16 and 17 respectively.

Each of the end cap members 16 and 17 comprise identical structural features which will be identified by like reference numerals wherever possible.

In plan, each end cap member 16 or 17 is more or less semi-elliptical in configuration, being formed as a thin wall integral molded plastic member forming a hollow shell with a centrally disposed boss 18 depending from an upper wall portion and providing a threaded aperture 19 to receive a similarly threaded fastening member 20 adapted to be passed through the aperture 13 in registry with the boss 18 and the threaded aperture 19.

Each end cap member 16 and 17 is further provided with a lug 21 adjacent the end wall portion thereof which is spaced from the boss 18 and which is adapted to be received and seated in the aperture 14, thereby locking the respective end cap member against lateral displacement with respect to the surface 12.

The interior of each respective end cap member 16 and 17 is further characterized by the provision on each side of the centrally disposed boss of a generally circular recess 22. Received in the respective recesses 22 are a pair of laterally spaced generally circular boss portions 23 formed on one end of a link arm or lever arm 24.

As shown in Figure 7, the arrangement thus provided results in the bifurcation of the one end of each link arm or lever arm 24 so that the circular boss portions 23 form the spaced apart legs of a yoke portion straddling each respective boss 18 in an adjacent end cap member 16 or 17.

At the forward end of each recess 22, the end cap member is provided with a downwardly extending lip 26 which will be spaced from the surface 12 when the fasteners 20 are drawn tightly to assemble the end cap members 17 in firm assembly with the portable article 11 to form a throat of a smaller width than the diametral dimension of the circular boss portions 23. Accordingly, each of the link arms or lever arms 24 will be confined by the corresponding end cap member 16 or 17 for pivotal movement only.

Referring particularly to Figures 1, 2 and 7, it will be noted that the link arms or lever arms 24 are generally S-shaped in configuration and are particularly characterized on the upper surface thereof by a pair of upstanding longitudinally extending ribs 27 together forming a guideway 28, the purpose of which will become manifest presently.

The ribs 27 are preferably located adjacent each opposite margin of the link arm or lever arm 24 so as to constitute a side wall 28 presenting a flat engagement surface.

Because of the S-shaped configuration of the link arm or lever arm 24, the top surface lying between the upstanding ribs 27 provides what appears to be a camming surface 29 and the lower surface likewise presents a curved bearing surface indicated at 30.

An elongated handle member 31 preferably comprising a thin wall trough-shaped integral molded plastic member open on the top side extends between the end cap member 16 and 17.

The bottom wall of the handle member 31 is indicated at 32 and is curved into an arcuate configuration so as to conform into a gripping surface suitable to be engaged by the hands of a user. At opposite ends of the handle member 31, the bottom wall 32 is characterized by spaced apart bosses 33 providing a flat engagement surface 34 adapted to seat on the flat surface 12 of the portable article 11.

The curved bottom wall 32 of the handle member 31 blends into the upstanding side walls 36. At opposite ends, the handle member 31 is provided with end walls 37 particularly characterized by a boss 35 of generally rectangular configuration extending inwardly into the open top trough-shaped recess surrounded by the side walls 36 and the end walls 37.

A counter-bore recess 38 is preferably provided adjacent the top side of the handle member 31 and receives and seats a flat cover member 39 which may also conveniently be made as a thin wall integral molded plastic member. At opposite ends, the cover member 39 is provided with a locating lug 40 adapted to be received and seated in a complementally shaped recess 41. Suitable adhesive may be provided so that the cover member 39 and the handle member 31 will be placed in firm assembly with one another.

The boss portions 33 of the handle member 31 are characterized by openings 42 which extend through the bottom surface 34 and a slot 43 is also provided in the opposite end walls 37 so that the other ends of each of the link arms or lever arms 24 are slidably extended through the openings 42 and are wholly received within the interior of the handle member 31.

As will be particularly noted upon referring to Figure 1, the boss 35 on each end of the handle member 31 is of approximately the same width as the dimension between the upstanding ribs 27 and provides a corner portion 43 which is adapted to engage the curved camming surface 29.

The boss portion 33 on each end of the handle portion 31 also provides an engagement surface 44 which is adapted to engage the curve surface 30 on the bottom of each respective link arm or lever arm 24.

When the handle member 31 is in an inactive position, both of the link arms or lever arms 24 will lie in abutting relation to the flat surface 12 of the portable article 11 as will the surfaces 34 on the respective boss portions 33 so that the handle member 31 will lie between the end cap members 16 and 17 and the cover member 39 will lie substantially flush with the tops of each of the respective end cap members 16 and 17. In this position, the slots 43 provide a clearance for the link arms or lever arms 24. In accordance with the principles of the present invention, means are provided to confine each respective link arm or lever arm 24 within the handle member 31 so as to preclude inadvertent dis-assembly thereof and also to prescribe the outer limits of displacement of the handle member 31 away from its inactive position between the pivotally confined ends of the link arms or lever arms 24 or, in other words, from a position between the end cap members 16 and 17. As is clearly shown in Figures 1, 2 and 7, each end portion of the respective link arms or lever arms 24 is provided with an enlarged generally circular boss 46 which is preferably of a larger diametral dimension than the throat between the corner 43 and the surface 44. Accordingly, when the handle member 31 is pulled upwardly, the boss portion 46 on each link arm or lever arm 24 will engage the corresponding boss portion 33 and carrying force will be transmitted from the handle 31 through the respective link arms or lever arms 24, to the end cap members 16 and 17 and vents to the portable article 11.

It is contemplated in accordance with the principles of the present invention to have the confining means include resilient means which tend to return bias the handle member 31 inwardly, or in other words, which tend to return bias the handle member 31 towards its inactive position.

In the form of the invention shown in Figures 1 and 2, a coil spring 47 is provided and the opposite ends thereof are hooked into a recess 48 provided in the respective boss portions 46.

In operation, the coil spring 47 tends to bias the link arms or lever arms 24 towards one another and since each arm provides the arcuately curved camming surface 29 and the arcuately curved surface 30 to engage the corresponding adjacent engagement surface 43 or 44, respectively, the bias force exerted by the coil spring 47 will actuate the handle member 31 downwardly into its inactive position.

In the form of the invention shown in Figure 3, an end cap member 50 is connected to the flat surface 51 of a portable article 52 by a screw 53 locked in engagement with a locking washer 54 on the interior of the end cap member 50.

A bracket member 56 is also provided on the interior of the end cap member 50 and includes an eye 57 providing a pivotal seat for a correspondingly shaped eye portion 58 on one end of a lever arm 59.

The lever arm 59 preferably takes the form of a sheet form member bent into shape to provide the eye 58 at one end and a second eye 60 at the other end.

A hollow handle member 61 has a bottom opening 62 and a side opening 63 through which the lever arm 59 is extended and a depending boss 64 provides a restricted throat of smaller size than the eye 60 so as to confine the end of the lever arm 59 in the handle 61.

The opposite end of the lever arm 59 is confined for pivotal movement only by virtue of the relationship between the eye 58 and the eye 57.

In operation, the handle 61 can be moved between the full line and dotted line positions of Figure 3.

In the form of the invention shown in Figure 5, the end cap member is indicated at 66 and is connected by a fastener 67 to a portable article 68. A bracket 69 provides a pivot pin 70 confining for pivotal movement only a lever arm 71 having an eye 72 received on the pin 70.

The handle member is indicated at 73 and is particularly characterized by a flat leaf-type spring 74 having a slot 75 formed therein, the slot 75 receiving a lug 76 struck up from adjacent one end of the lever arm 71.

In other words, in the structure of Figure 5, the confining means include the tongue and groove means between the lever arm 71 and the handle member 73. When the handle member 73 is lifted upwardly, the lug 76 will engage the opposite end of the slot 75 as is indicated in dotted lines in Figure 6.

Although various minor modifications might be suggested by those versed in the art, it should be understood that I wish to embody within the scope of the patent warranted hereon all such modifications as reasonably and properly come within the scope of my contribution to the art.

I claim as my invention:

1. A handle assembly comprising, in combination, a generally trough-shaped elongated grip member having side walls surrounding an open topped recess and particularly characterized by openings in opposite ends extending through the bottom thereof, bosses on opposite end walls of said side walls overlying said openings, each of said bosses and a corresponding adjacent portion of the bottom of said grip member together forming a throat of restricted width and providing spaced apart engagement surfaces, a generally S-shaped link member extending through each respective throat with one end of each link member in said open topped recess and the other end outside of said grip member, a coil spring connected at each end to said one end of each respective link member and operating to bias said link members toward one another, each link member providing on its upper surface an arcuately curved camming surface engaging the corresponding adjacent engagement surface formed on a respective one of said bosses and further providing a pair of laterally spaced upstanding ribs on its upper surface cooperating with a respective one of said bosses to confine the relative movement of each link arm and boss, an enlarged portion at said one end of each link arm of larger size than said restricted throat and adapted to abut said engagement surface, a yoke portion at the said other end of said link member providing laterally spaced apart generally circular boss portions, end cap members at opposite ends of said grip member and each providing spaced recesses conforming in shape with and receiving said circular boss portions to confine said link members for pivotal movement only with respect thereto, each end cap member further providing a locating lug at the bottom surface thereof and also including an apertured boss portion between said spaced recesses, means providing a flat support surface and having a pair of spaced apart locater openings each receiving a respective locating lug and a pair of spaced apart openings in register with said apertured boss portions, fastening means extending through said openings and into said apertured boss portions to lock said end cap members in firm assembly with said support surface, and a cover on said grip member closing said open topped recess, whereby an upwardly direct force on said grip member in excess of the biasing force exerted by said spring will pivot said link members with respect to said end cap members and said grip member will be moved relative to said end cap members and upon release thereof, said spring will return said grip member to a position against said support surface and between said end cap members.

2. A handle assembly comprising an elongated hollow grip member having openings in opposite ends extending through the bottom thereof, link members at opposite ends of said grip member each having one end telescopically concealed inside of said grip member and each having an opposite end extending out through a corresponding one of said openings, each said opposite end having a generally circular pivot joint part formed thereon, an end cap member adapted to be fastened to an article to be carried at each end of said grip member formed with a confining recess receiving and providing a pivot socket for said pivot joint part of a corresponding link member, resilient means inside of said grip member acting on each of said one ends of said link members to normally bias said link members into retracted position inside of said grip member when not in use while affording relative telescopic movement of said link members and said grip member, and stop means between said link and grip members limiting outward telescopic movement therebetween and transmitting load from said end cap members to said grip member when the handle assembly is in use.

3. A handle assembly as defined in claim 2 and said resilient means comprising a coil spring having opposite ends connected to said link members, said stop means including an enlarged boss on said one end of each link member to engage a shoulder provided on said grip member.

4. A handle assembly as defined in claim 2, said resilient means comprising a slotted leaf type spring engaging the ends of said link members, said stop means including a lug on said one end of said link members received in a corresponding slot of the spring and engaging a shoulder adjacent the outer end of the slot when the grip member is lifted.

References Cited in the file of this patent
UNITED STATES PATENTS

| | | |
|---|---|---|
| 670,492 | Gould | Mar. 26, 1901 |
| 1,459,755 | Speidel | June 26, 1923 |
| 2,009,192 | Freysinger | July 23, 1935 |